United States Patent [19]

Kirksey

[11] Patent Number: 5,045,264

[45] Date of Patent: Sep. 3, 1991

[54] METHOD AND APPARATUS FOR MAKING EXTRUDED PLASTIC FILM WITH STRIPS EMBEDDED THEREIN OF A SECOND THERMOPLASTIC MATERIAL

[75] Inventor: William A. Kirksey, Midland, Mich.

[73] Assignee: DowBrands, Inc., Indianapolis, Ind.

[21] Appl. No.: 502,144

[22] Filed: Mar. 29, 1990

[51] Int. Cl.⁵ ............................................. B29C 47/04
[52] U.S. Cl. .................................. 264/171; 264/245; 425/131.1; 425/133.5; 425/462; 425/144
[58] Field of Search ............................. 264/171, 245; 425/131.1, 133.5, 462, 144

[56] References Cited

U.S. PATENT DOCUMENTS

| | | |
|---|---|---|
| 3,485,912 | 12/1969 | Schrenk et al. |
| 3,565,737 | 2/1971 | Lefevre et al. |
| 4,426,344 | 1/1984 | Dinter et al. .................... 425/131.1 |
| 4,435,141 | 3/1984 | Weisner et al. |
| 4,731,004 | 3/1988 | Wenz, Jr. ............................ 425/462 |
| 4,789,513 | 12/1988 | Cloeren ......................... 425/131.1 |
| 4,839,131 | 6/1989 | Cloeren ......................... 425/131.1 |
| 4,923,551 | 5/1990 | Wagers et al. ....................... 264/171 |

FOREIGN PATENT DOCUMENTS

| | | | |
|---|---|---|---|
| 2343582 | 11/1977 | France .............................. 425/131.1 |
| 62-248626 | 10/1987 | Japan ................................... 264/171 |
| 63-21123 | 1/1988 | Japan ............................. 425/131.1 |
| 63-165474 | 7/1988 | Japan ................................... 264/171 |

*Primary Examiner*—Jeffery Thurlow

[57] ABSTRACT

Method and apparatus for manufacturing a composite film of a matrix material and of a second material in the form of one or more strips of the second material which are embedded in the matrix material at one or both surfaces of the composite film.

18 Claims, 3 Drawing Sheets

METHOD AND APPARATUS FOR MAKING EXTRUDED PLASTIC FILM WITH STRIPS EMBEDDED THEREIN OF A SECOND THERMOPLASTIC MATERIAL

BACKGROUND OF THE INVENTION

The present invention relates to methods and apparatus for the production of extruded plastic film. More particularly, the invention relates to methods and apparatus for the production of extruded plastic film having strips of a second thermoplastic material embedded in one or both surfaces of the film.

Several methods and apparatus are presently disclosed in the art for the coextrusion of strips, ribbons and the like of a second material wholly or partly within a surrounding matrix of a first thermoplastic material.

For example, commonly-assigned U.S. Pat. No. 3,565,737 to Lefevre et al. (hereafter, the '737 patent) discloses a composite film which has increased cling, wherein the composite film has a body portion made from a low cling plastic with strips of relatively high cling material embedded in each major surface of the body portion.

An apparatus illustrated in the '737 patent for producing the composite film uses two extruders. One extruder provides a plastified film forming thermoplastic material to a sheeting die to form the main body of the coposite film. A second extruder, meanwhile, feeds the adhesive material in the form of strips into the plastified mass of main body material prior to the two materials being forced out through a die opening. Die arrangements for accomplishing this feeding of the second material into the first include arrangements for discharging the second material both cross-currently and co-currently into the first material.

Commonly-assigned U.S. Pat. No. 3,444,031 to Schrenk discloses a method and apparatus for making a "light diffusing panel", involving the co-current extrusion of a plurality of elongated parallel strips of an optically different thermoplastic composition within a surrounding matrix material.

Significant drawbacks are seen with such known methods and apparatus, however, as regards the production of films from certain combinations of materials.

Using for purposes of illustration the polyethylene/ethylene-vinyl acetate film exemplified in the '737 patent, it is well known that ethylene-vinyl acetate copolymers (EVA) can degrade when extruded above certain temperatures, depending on the residence time of such copolymers in the extrusion apparatus.

In known apparatus which fully or partially encapsulate the EVA copolymers in a polyethylene matrix by having the EVA flow co-currently with the polyethylene in a conduit which terminates inside of a sheeting die, the transfer of heat from the polyethylene across the conduit walls is a potential source of degradation of the EVA.

Cross-current feeding of the EVA into the higher temperature polyethylene sheet prior to the exit of the composite film from the sheeting die would be advantageous, then, from the perspective of limiting heat transfer from the polyethylene to heat transferred from the point of introduction of the EVA to subsequent cooling of the composite film.

Cross-current introduction of lower viscosity materials such as EVA into the polyethylene sheet, however, results in shear migration of the EVA as the composite body of materials formed thereby progresses through the die The process thus results in strips of the EVA which are wider than the stream of EVA injected into the polyethylene sheet.

Where the distance between the point of introduction of the EVA and the exit of the die is not particularly large, as with the apparatus described in the '737 patent, the shear migration may not be especially troublesome.

Where the flexible die lip technology commonly used for commercial width extrusion dies is sought to be employed, however die than the point of introduction of the EVA is a greater distance away from the exit of the die than in the '737 patent. It has been observed that while this increased distance may not be so large as to cause appreciably greater degradation of the strip-comprising EVA copolymers, shear migration of the EVA strips in the composite film can be sufficiently pronounced that the strips begin to overlap and cause blocking when the film is wound onto a roll.

It would thus be desirable also if the shear migration associated with cross-current feeding of lower viscosity strip-comprising materials at locations removed from the die lips were able to be limited to an extent, while at the same time allowing for the use of the commonly-practiced flexible die lip technology.

SUMMARY OF THE INVENTION

The present invention overcomes the shortcomings of the prior art, and facilitates the manufacture in commercial apparatus having an adjustable die gap of a composite film comprised of a first or matrix material and a second material in the form of one or more strips which are embedded in the matrix material at one or both surfaces of the film, wherein the second material is potentially degradable at the extrusion temperature of the matrix material and/or is characterized by a lower viscosity compared to the matrix material when coextruded therewith as the composite film.

The method of the present invention for manufacturing such a film comprises: providing a stream of a first heat-plastified extrudable thermoplastic film material to a cast film die: cross-currently feeding one or more streams of a heat plastified second material into the first material so that the streams of the second material are partially encapsulated in the first material, and so that a composite body of materials is formed of the first and second materials: and extruding the composite body of materials to form the film.

The apparatus provided for accomplishing this method includes: a cast film die having two opposed die portions, with at least one of these die portions having a plurality of strip channels defined therethrough which are laterally spaced and offset from strip channels in the opposed die portion: an extruding source of the first material in fluid communication with the cast film die; an extruding source of the second material in fluid communication with the plurality of laterally spaced and offset strip channels in one or both of the opposed die portions means for partially encapsulating the second material from the strip channels in the first material to form a composite body of materials: and means for extruding the composite body of materials to form a composite film.

DETAILED DESCRIPTION OF THE PREFERRED EMBODIMENTS

Figure 5:
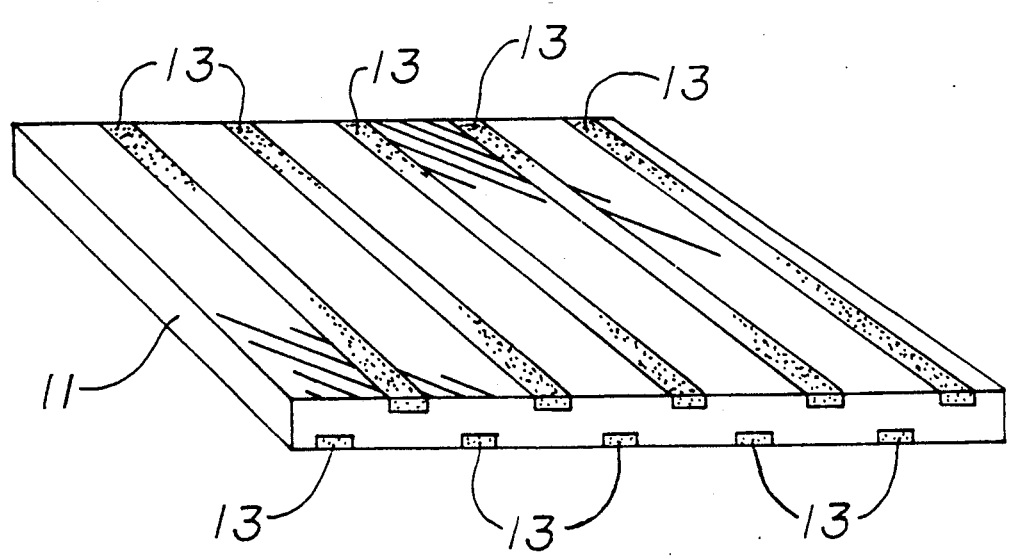
FIG. 5 is a perspective view of a section of plastic film produced in accordance with this invention.

Method and apparatus are described in commonly-assigned U.S. Ser. No. 07/164,705 to Wagers et al., now issued as U.S. Pat. No. 4,923,551, for producing extruded plastic film having strips of a material with differing adhesive characteristics embedded in both surfaces of the film. A typical section of a film of this description is shown in FIG. 5, wherein the base film receiving these strips is designated by the number 11, and the embedded strips are designated by the number 13. The first or matrix material for the composite film can be selected from a wide variety of materials, including in particular the low density polyethylene resins. The second, adhering material can be selected from such materials as the copolymers of ethylene and vinyl acetate.

It is expected that the benefits of the present invention will be most fully realized in the production of a film of this nature, wherein the second material is both potentially degradable and possesses a lower viscosity than the first material when extruded therewith to form the film. Accordingly, a preferred application of the method and apparatus of the present invention will be for the manufacture of the films described in the aforementioned Wagers patent and shown in FIG. 5, the Wagers patent being hereby incorporated herein by reference.

Figure 1:
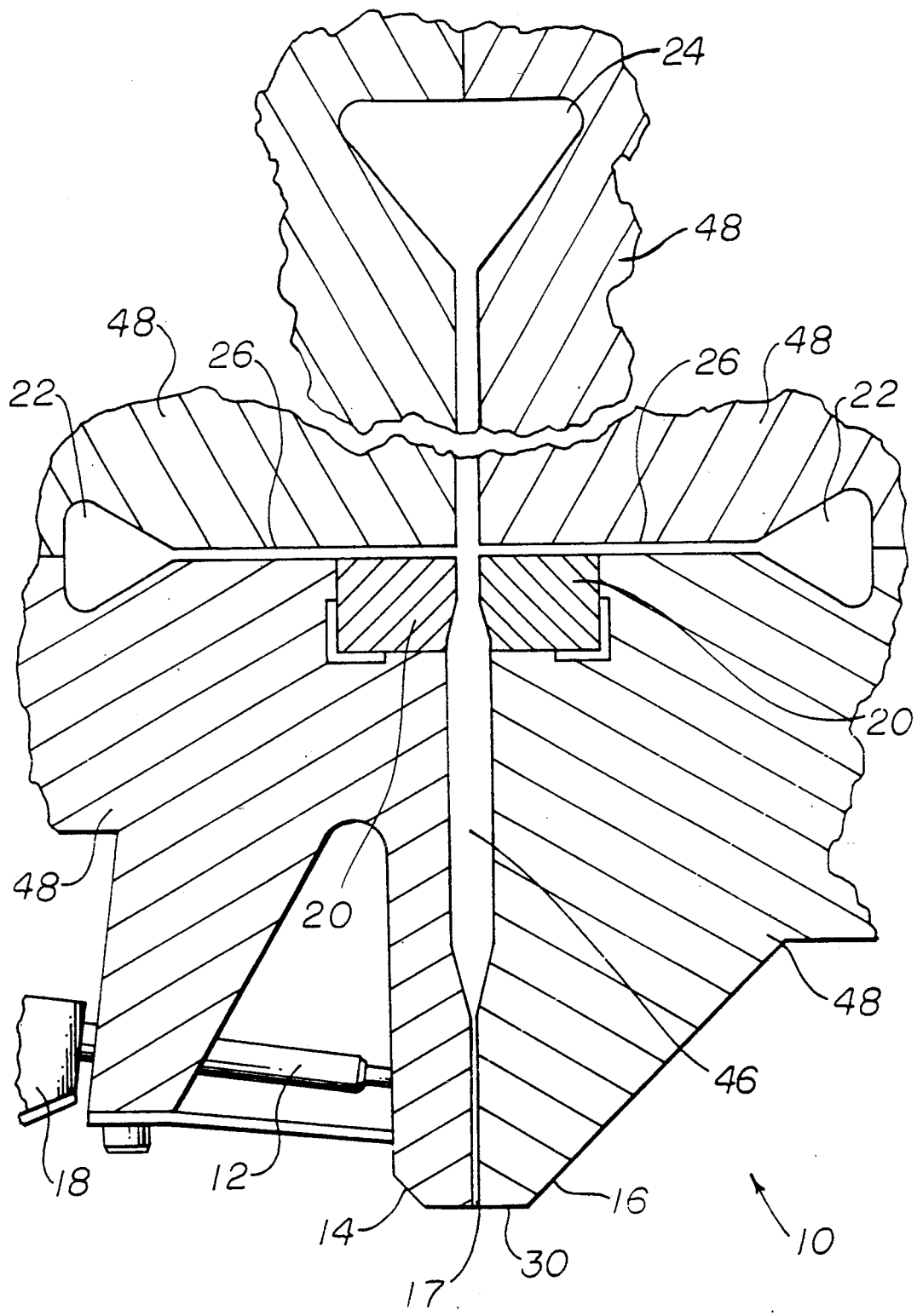
FIG. 1 is a fragmentary cross-sectional view of a preferred embodiment of the apparatus of the present invention.

Referring now generally to FIG. 1, a preferred apparatus 10 for making films of the type shown in FIG. 5 employs a bolt 12 which is associated with a hinged die lip 14 for forcing the die lip 14 toward an opposed die lip 16 and for thus narrowing the gap 17 defined between die lips 14 and 16, with means such as the die bolt heater 18 for automatically adjusting the length of the bolt 12 and thus the positioning of the die lips 14 and 16 relative to one another. It will, of course, be appreciated that in commercial flexible die lip technology, a number of bolts 12 and associated heaters 18 will normally be employed over the width of the die apparatus 10, the apparatus 10 being shown in FIG. 1 in representative cross-section only.

Figure 2:
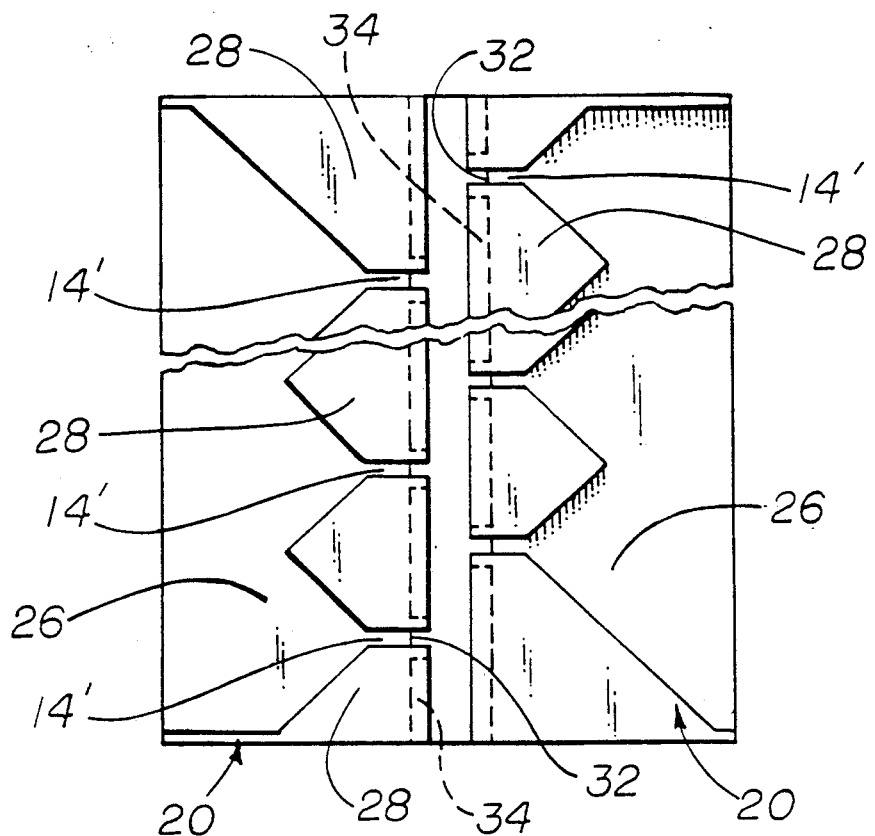
FIG. 2 is a partial top planar view of the opposed die portions of the apparatus of FIG. 1, taken generally along line 2-2 in FIG. 1.
Figure 3:
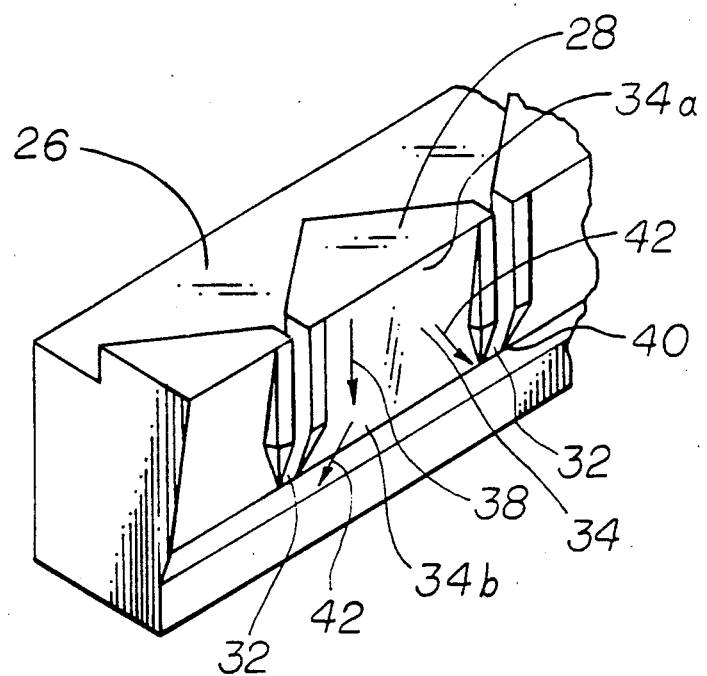
FIG. 3 is an enlarged fragmentary perspective view of an insert bar in a preferred embodiment of the die portions of FIG. 2.
Figure 4:
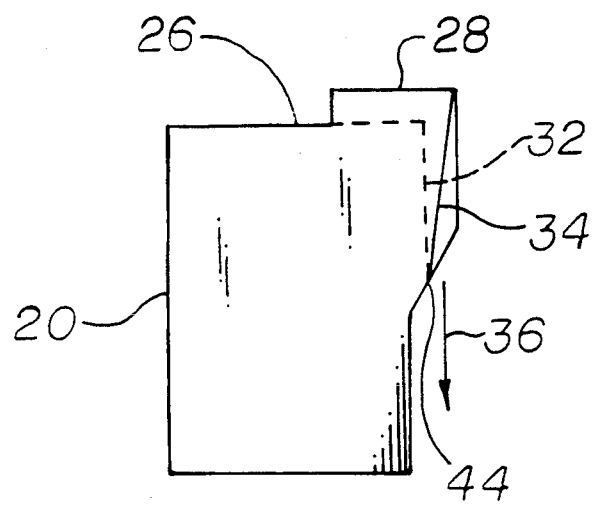
FIG. 4 is an end view of the insert bar of FIG. 3.

The apparatus 10 is further provided with opposed die portions 20 which are more particularly shown in FIGS. 2-4 in the form of insert bars but which may also be integrally formed with other parts of the die. It is through these inserts 20 generally that the cross-current feeding and partial encapsulation is accomplished of streams of EVA from manifolds 22 in a polyethylene mass flowing between the die portions 20, the polyethylene mass having been extruded from a core manifold 24.

It is expected that the second or strip-comprising materials supplied to each of the inserts 20 will normally be the same, and that the inserts 20 will normally be identically constructed, as suggested in FIGS. 2-4. It is to be understood, however, that the inserts 20 need not necessarily be identically constructed, for example where the strip-comprising materials supplied to each are different, but wherein at least one of the strip-comprising materials has the degradability and/or viscosity characteristics indicated for the second materials for which the present invention is deemed most useful.

Preferably, however, the inserts 20 are substantially identically constructed (FIGS. 2-4), and each comprise means for partially encapsulating a stream of the second material (e.g., EVA) from an extruding source thereof in the first material (e.g. polyethylene), to form a composite body of materials.

This means for partially encapsulating a stream of the second material in the first material preferably comprises means for cross-currently feeding the stream of the second material into a plastified mass of the first material passing between the opposed die portions or inserts 20, and means for diverting a portion of the plastified mass of the first material adjacent such stream and with respect to such stream so as to partially encapsulate the stream in the portion of the plastified mass.

"Partial encapsulation" as used herein, it should be noted, is intended to express the idea of surrounding and enfolding the stream of the second material in this adjacent portion of the plastified mass of the higher viscosity first material while combining the first and second materials in co-current flow. The greater flow resistance of the first material is in effect utilized to limit the increase in strip width by shear migration that would otherwise occur with the use of a hinged die lip 14 as opposed to the use of die lips as previously described in the Wagers patent. The inserts 20, then, in partially encapsulating streams of the EVA within a polyethylene matrix can be seen as contributing to the formation of embedded EVA strips of an acceptable strip width.

The means for cross-currently feeding the second material in the form of a plurality of streams into a plastified mass of the first material can include the substantially parallel strip channels 14' and associated elongated internal cavities described in the Wagers patent, or in a preferred embodiment can include one or more of the teardrop manifolds 22 (as in FIG. 1) in combination with the substantially parallel strip channels 14' of the Wagers patent.

It is believed that the use of manifolds 22 rather than of the elongated internal cavities shown and described in the Wagers patent should streamline flow of the second material through the apparatus 10 and minimize so-called "dead areas" in the flow path of the EVA copolymers or other second material. In this last respect it is also therefore preferred, as seen in FIGS. 2 and 3 particularly, that the second material be channeled from a manifold 22 through an associated land 26 into the strip channels 14' by projections 28 having a tapered upstream shape.

In the preferred apparatus, then, the second material is communicated from any conventional extruding source thereof (not shown) to manifolds 22, whereupon the second material is delivered by associated lands 26 and projections 28 to the strip channels 14' for forming streams of the EVA or other second material. These streams are then directed cross-currently against and into the plastified mass of the first material flowing between die portions or inserts 20, the first material having been communicated from a conventional extruding source thereof (also not shown) through the manifold 24 to a position between the inserts 20.

As an aside, describing the feeding of the second material into the first material as being "cross-current" is not meant to suggest that the streams of the second material must necessarily be introduced into the first material at right angles thereto. Rather, "cross-currently" feeding the second material into the first is intended to suggest the infusion of the second material into the first from within the die portions 20 generally at a point that is as close to the exit 30 of the die as possible given the use of a hinged die lip 14.

The streams of the second material, after being cross-currently fed into engagement with the plastified mass of the first material as just described, then flow co-currently within the confines of passages 32 with the plastified mass of the first material, while portions of the first material are diverted by passages 34 to encapsulate the stream.

The means for diverting a portion of the plastified mass of the first material adjacent a stream of the second material and with respect to such stream thus preferably comprises a group of alternating passages 32 and 34 through which the streams of the second material and the diverted portions of the first or matrix material flow, respectively.

The passages 32 are each associated with a stream of the second material emerging from a strip channel 14' and extend from such strip channel in the direction of extrusion of the matrix material and of the composite film, as shown by the arrow 36.

The passages 32 are flanked on either side thereof by passages 34 which can be thought of as comprising two sub-parts, expressed as an upstream sub-part 34a and a downstream sub-part 34b. The upstream sub-part 34a operates to divert a portion of the first material laterally with respect to the direction of extrusion of the first or matrix material such as polyethylene. The flow path of the first material in an upstream sub-part 34a is suggested by the arrow 38, as seen most readily in FIG. 3.

The downstream sub-part 34b of each passage 34 is characterized by an expansion of the passage 34 toward the downstream terminus 40 of any adjacent passage 32, as suggested by the arrows 42 in FIG. 3. A passage 34 located between passages 32 is thus wider in a downstream section, relative to the flow of the polyethylene or other matrix material therethrough, than at its upstream section.

While the sub-parts 34a and 34b have been described as separate elements, it will be observed from the preferred embodiment of FIGS. 3 and 4 that the lateral displacement of the first material in an upstream sub-part 34a may coincide in whole or in part with the expansion in a downstream sub-part 34b toward an adjacent passage 32. In this preferred embodiment, the sub-part 34b thus continues the lateral diversion begun by sub-part 34a to a point 44 which preferably substantially coincides with the depth or lateral extent of the passage 32, as shown in FIG. 4, while simultaneously diverting the portion of the first material flowing therethrough toward adjacent passages 32.

In some fashion, then, the first material flowing in passages 34 on either side of a given passage 32 will be both diverted or displaced laterally with respect to the direction of extrusion of the composite body of materials, and diverted inwardly toward and ultimately combined in co-current flow with the stream of the second material flowing within a passage 32.

After the first and second materials are thus combined in a composite body of materials, such composite body of materials will preferably enter into a zone 46 of gradually expanded flow, as seen in FIG. 1. The purpose of this zone 46 is to reduce shear migration of the second material in the embedded strips by reducing the shear rate of the composite body of materials. The expansion and contraction of the composite body of materials in the zone 46 should not, however, be so dramatic over the distance to the die lips 14 and 16 that eddies are set up by entrance and exit effects which would disrupt or excessively distort the strips of the second material and thereby overcome the benefit to be gained from the expansion initially.

To minimize the risk of degradation of the EVA copolymers in the die with higher extrusion temperatures for the polyethylene matrix material, it is desirable to achieve the highest temperature difference possible between the upper portions of the die wherein the polyethylene is introduced and the lower portions of the die wherein the EVA copolymers are introduced and extruded. In practice, however, the achievable temperature difference using thermocouples and associated heaters in various segments of the apparatus 10 may be limited by conduction to an extent whereby it may prove advisable or necessary to employ two or more of the manifolds 22 in conjunction with and over the width of a given die portion 20, rather than just a single manifold 22. Dual or so-called "Siamese" manifolds are known to have been used in extrusion, but have not found favor because a weld line generally results at the interface between materials discharged from the manifolds.

In order to maintain a consistent temperature difference between the upper part of the die and the lower part of the die, thermocouples, heaters and any conventional associated control means (not shown) are preferably used in a number of temperature control zones 48 as shown in FIG. 1. These temperature control zones 48 are associated with the upper part of the die and the introduction of the polyethylene matrix material through a manifold 24, with segments of the die on the upstream sides of the teardrop manifolds 22 for introducing the EVA second material, and with segments of the die on the downstream side of the manifolds 22 encompassing the die lips 14 and 16. The temperature control zones 48 associated with each of these segments may extend over the width of the apparatus, but preferably each temperature control zone 48 will be subdivided into a plurality of individually monitored and controlled temperature zones whereby uniform conditions may be substantially maintained for extruding the center as well as the edges of a continuous composite film.

Other modifications of an obvious nature may be made also to the preferred apparatus as described above and shown in FIGS. 1-4 without departing in spirit and scope from the present invention as defined by the appended claims. For instance, the various passages 32 and passages 34 in other embodiments may be the same or different, as where strips of the second material are to be alternated in the composite film with strips of a third material and/or strips of a different size.

What is claimed is:

1. A method of making a composite film comprised of a first material and a second material in the form of one or more discrete strips of the second material which are embedded in a matrix of the first material at one or both surfaces of the composite film by extrusion apparatus having an adjustable die gap, wherein the method comprises the steps of:

providing a stream of a first, heat-plastified extrudable thermoplastic film material to a cast film die;

cross-currently feeding one or more streams of a heat-plastified second material into the first material flowing through the cast film die;

diverting a portion of the first material adjacent a stream of the second material with respect to the stream of the second material so that the stream is partially encapsulated within a matrix of the first material and forms a composite body of materials with the first material; and extruding the composite body of materials from the cast film die to form the composite film.

2. The method of claim 1, wherein the step of diverting a portion of the first material comprises:

diverting the portion of the first material laterally with respect to the direction of extrusion of the first material through the cast film die; and diverting the portion of the first material toward the stream of the second material.

3. The method of claim 2, further comprising the step of combining in co-current flow the portion of the first material and the stream of the second material.

4. The method of claim 1, wherein the second material is characterized by being potentially degradable at and above extrusion temperatures commonly commercially employed in extruding the first material.

5. The method of claims 1 and 4, wherein the second material is characterized as possessing a lower viscosity compared to the first material in the composite body of materials.

6. An apparatus for making a composite film comprised of a first material and a second material in the form of one or more discrete strips of the second material which are embedded within a matrix of the first material at one or both surfaces of the composite film, comprising:

a cast film die having two opposed die portions, wherein at least one of the two opposed die portions has a plurality of strip channels defined therethrough which are laterally spaced and offset from the strip channels in the opposed die portion;

an extruding source of the first material which is in fluid communication with the cast film die;

an extruding source of the second material in fluid communication with the plurality of laterally spaced and offset strip channels;

means for partially encapsulating the second material from the strip channels within a matrix of the heat-plastified first material flowing between the opposed die portions to form a composite body of materials; and means for extruding the composite body of materials to form the composite film.

7. An apparatus as defined in claim 6, further comprising a zone of expanded flow of the composite body of materials.

8. An apparatus as defined in claim 6, wherein the means for partially encapsulating the second material in the first material comprises:

means for cross-currently feeding a stream of the second material into a plastified mass of the first material passing between the two opposed die portions; and means for diverting a portion of the plastified mass of the first material adjacent the stream of the second material with respect to the stream of the second material, such that the stream is partially encapsulated in the portion of the plastified mass of the first material.

9. An apparatus as defined in claim 8, wherein the means for cross-currently feeding a stream of the second material into a plastified mass of the first material includes at least one tear drop manifold in fluid connection with the strip channels in a die portion and with the extruding source of the second material, for distributing material from the extruding source to such strip channels.

10. An apparatus as defined in claim 8, wherein the means for diverting a portion of the plastified mass of the first material adjacent the stream of the second material comprises first and second alternating passages for the co-current flow of the portion of the first material and of the stream of the second material to be encapsulated therein, respectively.

11. An apparatus as defined in claim 10, wherein the first alternating passages adjacent to and on either side of a second alternating passage are each comprised of an upstream sub-part and a downstream sub-part, the upstream sub-part being configured to divert the portion of the first material flowing therethrough laterally with respect to the direction of extrusion of the first material to a point substantially corresponding to the lateral extent of the second alternating passage, and the downstream sub-part being configured to divert the portion of the first material flowing therethrough toward adjacent second alternating passages.

12. An apparatus as defined in claim 6, wherein both of the die portions have a plurality of strip channels defined therethrough which are laterally spaced and offset from strip channels in the opposed die portion.

13. An apparatus as defined in claim 12, wherein each die portion has from 24 to 144 strip channels defined therethrough, depending upon the width of the composite film which is extruded.

14. An apparatus as defined in claim 13, wherein strip channels in each die portion are equidistant from adjoining strip channels.

15. An apparatus as defined in claim 14, wherein each strip channel in a die portion is laterally offset approximately one-half the distance between strip channels in the opposing die portion.

16. An apparatus as defined in claim 6, wherein the second material is characterized by being potentially degradable at and above extrusion temperatures commonly commercially employed in extruding the first material.

17. An apparatus as defined in claims 6 and 16, wherein the second material is characterized as possessing a lower viscosity compared to the first material in the composite body of materials.

18. An apparatus as defined in claims 6 or 16, further comprising means for monitoring and controlling the temperatures of one or more die segments of the apparatus.

* * * * *